US010444989B2

(12) United States Patent
Yamano

(10) Patent No.: US 10,444,989 B2
(45) Date of Patent: *Oct. 15, 2019

(54) INFORMATION PROCESSING APPARATUS, AND INPUT CONTROL METHOD AND PROGRAM OF INFORMATION PROCESSING APPARATUS

(71) Applicant: SONY CORPORATION, Tokyo (JP)

(72) Inventor: Ikuo Yamano, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/243,637

(22) Filed: Jan. 9, 2019

(65) Prior Publication Data

US 2019/0146667 A1 May 16, 2019

Related U.S. Application Data

(63) Continuation of application No. 13/268,270, filed on Oct. 7, 2011, now Pat. No. 10,203,869.

(30) Foreign Application Priority Data

Oct. 15, 2010 (JP) .................................. 2010-232240

(51) Int. Cl.
*G06F 3/0488* (2013.01)

(52) U.S. Cl.
CPC ...... *G06F 3/04886* (2013.01); *G06F 3/04883* (2013.01); *G06F 2203/04808* (2013.01)

(58) Field of Classification Search
CPC .. G06F 3/0237; G06F 3/0488; G06F 3/04883; G06F 3/04886
See application file for complete search history.

(56) References Cited

U.S. PATENT DOCUMENTS

| 6,094,197 | A | 7/2000 | Buxton et al. |
| 8,212,785 | B2 | 7/2012 | Min et al. |
| 8,266,528 | B1 | 9/2012 | Hayes |
| 8,471,814 | B2 | 6/2013 | LaFave et al. |
| 9,229,615 | B2 | 1/2016 | Huotari |
| 2004/0140956 | A1 | 7/2004 | Kushler et al. |

(Continued)

FOREIGN PATENT DOCUMENTS

| JP | 2006-236988 A | 9/2006 |
| JP | 2007-066031 A | 3/2007 |

(Continued)

OTHER PUBLICATIONS

Dec. 9, 2015, European Search Report for related EP Application No. 11184125.0.

*Primary Examiner* — Amare Mengistu
*Assistant Examiner* — Crystal Mathews
(74) *Attorney, Agent, or Firm* — Paratus Law Group, PLLC

(57) ABSTRACT

An apparatus is provided for modifying an input area, comprising a memory and a processor executing instructions stored in the memory. The processor executes instructions stored in the memory to display a first input area on a device. The processor further executes instructions stored in the memory to detect a user input in a second input area. The processor still further executes instructions stored in the memory to perform, if the user input comprises a first operation, an input function; and modify, if the user input comprises a second operation, the first input area.

20 Claims, 15 Drawing Sheets

(56) References Cited

U.S. PATENT DOCUMENTS

| | | |
|---|---|---|
| 2006/0229108 A1 | 10/2006 | Cehelnik |
| 2007/0074131 A1 | 3/2007 | Assadollahi |
| 2007/0135104 A1 | 6/2007 | Suzuki et al. |
| 2008/0168366 A1 | 7/2008 | Kocienda et al. |
| 2008/0266263 A1 | 10/2008 | Motaparti et al. |
| 2008/0316183 A1 | 12/2008 | Westerman et al. |
| 2009/0007001 A1 | 1/2009 | Morin et al. |
| 2009/0058823 A1 | 3/2009 | Kocienda |
| 2009/0077464 A1 | 3/2009 | Goldsmith et al. |
| 2009/0167693 A1 | 7/2009 | Kuo et al. |
| 2009/0235165 A1 | 9/2009 | Fux et al. |
| 2010/0085321 A1 | 4/2010 | Pundsack |
| 2010/0225599 A1 | 9/2010 | Danielsson et al. |
| 2010/0309147 A1 | 12/2010 | Fleizach et al. |
| 2010/0333011 A1 | 12/2010 | Kornev et al. |
| 2010/0333027 A1 | 12/2010 | Martensson et al. |
| 2011/0047459 A1 | 2/2011 | Van Der Westhuizen |
| 2011/0157029 A1 | 6/2011 | Tseng |
| 2011/0161809 A1 | 6/2011 | Gilmour |
| 2011/0202836 A1 | 8/2011 | Badger et al. |
| 2011/0210850 A1 | 9/2011 | Tran |
| 2011/0210917 A1 | 9/2011 | LaFave et al. |
| 2011/0258542 A1 | 10/2011 | Kenney et al. |
| 2011/0291940 A1 | 12/2011 | Ghassabian |
| 2012/0068937 A1 | 3/2012 | Backlund et al. |
| 2012/0081316 A1 | 4/2012 | Sirpal et al. |
| 2013/0046544 A1 | 2/2013 | Kay et al. |
| 2013/0069915 A1 | 3/2013 | Kukulj |
| 2014/0289668 A1 | 9/2014 | Mavrody |
| 2016/0196028 A1 | 7/2016 | Kenney et al. |

FOREIGN PATENT DOCUMENTS

| | | |
|---|---|---|
| JP | 2009-205303 A | 9/2009 |
| KR | 10-2010-0042998 A | 4/2010 |

FIG. 2
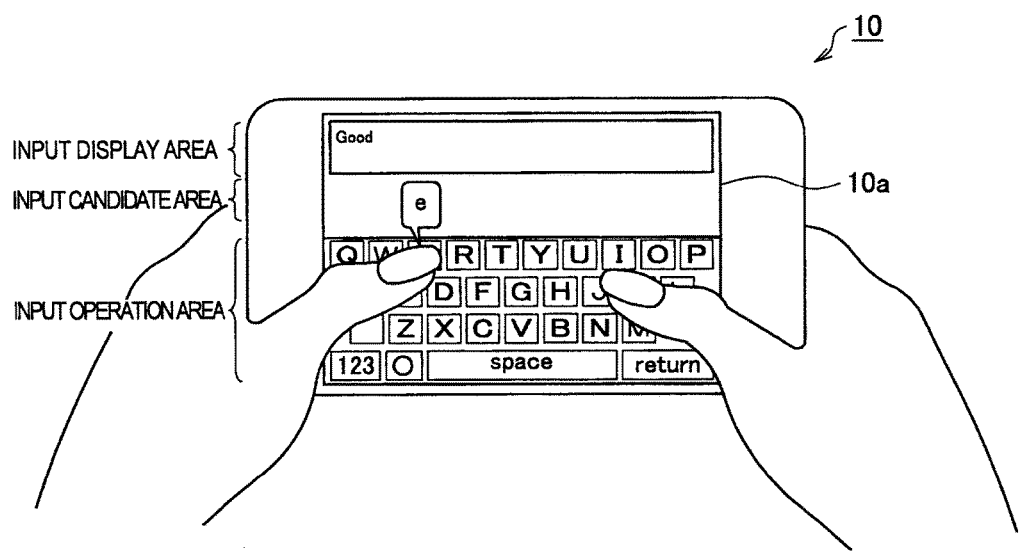
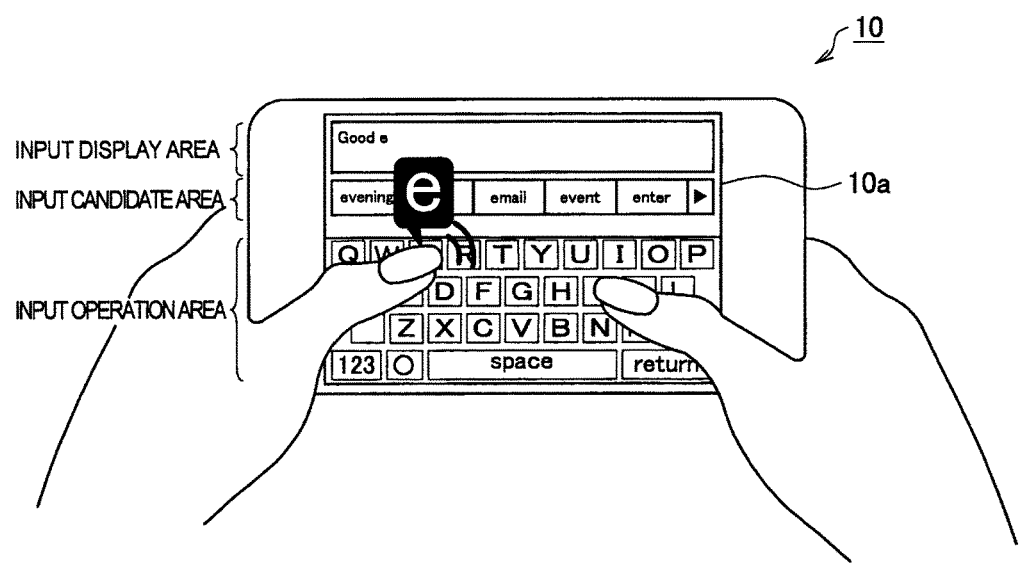

INFORMATION PROCESSING APPARATUS, AND INPUT CONTROL METHOD AND PROGRAM OF INFORMATION PROCESSING APPARATUS

CROSS REFERENCE TO PRIOR APPLICATION

This application is a continuation of U.S. patent application Ser. No. 13/268,270 (filed on Oct. 7, 2011), which claims priority to Japanese Patent Application No. 2010-0232240 (filed on Oct. 15, 2010), which are all hereby incorporated by reference in their entirety.

BACKGROUND

The present disclosure relates to an information processing apparatus, and an input control method and program of the information processing apparatus.

In recent years, electronic devices using touch panels or touch pads to perform an input operation have been widely used. Examples of the electronic devices include mobile phones, personal digital assistants, personal computers and car navigation systems.

For example, JP 2006-236988A discloses a capacitive touch panel. If an operator performs a stylus operation or a tap operation with his or her finger on a touch screen of this kind of device, the device detects the stylus or touch position of the operator's finger and selects or inputs a menu button or a key of a software keyboard at the detected touch position.

SUMMARY

In general, a touch screen includes an input candidate area for an input candidate, such as a suggested word candidate expected from entered characters or context or a corrected word candidate estimated from mistakenly entered characters, in addition to a keyboard area (i.e., an input operation area) where such a software keyboard as a QWERTY keyboard is arranged. The input candidate is typically displayed on an upper side of the keyboard area. In this case, an operator may need to select an input candidate by means of, for example, a tap operation in an area other than the keyboard area while inputting characters by means of, for example, a tap operation in the keyboard area.

In general, the keyboard area is designed to take up most of a space for an operator's finger to be moved as easily as possible. This causes the operator performing an input operation to carry a heavy burden when the operator moves his or her finger to an area other than the keyboard area to select an input candidate. In order to allow the operator to easily select the input candidate, the input candidate may be placed in an area for the operator's finger to be moved as easily as possible by making the keyboard area smaller. In this case, however, since each button or each key in the keyboard area also needs to be made smaller accordingly, the operator makes frequent mistakes in pressing each button or each key and has difficulties inputting each button or each key correctly.

To deal with this problem, there is a need for an information processing apparatus and an input control method and program of the information processing apparatus, enabling the operator to easily select the input candidate without laying a burden on the operator performing the input operation by providing an appropriate size of input operation area in the touch screen.

Accordingly, there is provided an apparatus for modifying an input area, comprising a memory and a processor executing instructions stored in the memory. The processor executes instructions stored in the memory to display a first input area on a device. The processor further executes instructions stored in the memory to detect a user input in a second input area. The processor still further executes instructions stored in the memory to perform, if the user input comprises a first operation, an input function; and modify, if the user input comprises a second operation, the first input area.

In a second aspect, there is provided a method for modifying an input area. The method comprises displaying a first input area. The method further comprises detecting a user input in a second input area. The method still further comprises performing, if the user input comprises a first operation, an input function; and modifying, if the user input comprises a second operation, the first input area.

In a third aspect, there is provided a non-transitory computer-readable medium storing instructions which, when executed by a computer, perform a method of modifying an input area. The method comprises displaying a first input area. The method further comprises detecting a user input in a second input area. The method still further comprises performing, if the user input comprises a first operation, an input function; and modifying, if the user input comprises a second operation, the first input area.

As described above, according to the present technology, it is possible to easily select an input candidate without laying a burden on an operator performing an input operation by providing an appropriate size of input operation area in a touch screen.

BRIEF DESCRIPTION OF THE DRAWINGS

FIG. 2 is a view illustrating operation example 2 for a software keyboard of an electronic device according to a second embodiment of the present disclosure;

DETAILED DESCRIPTION OF THE EMBODIMENT(S)

Figure 1:
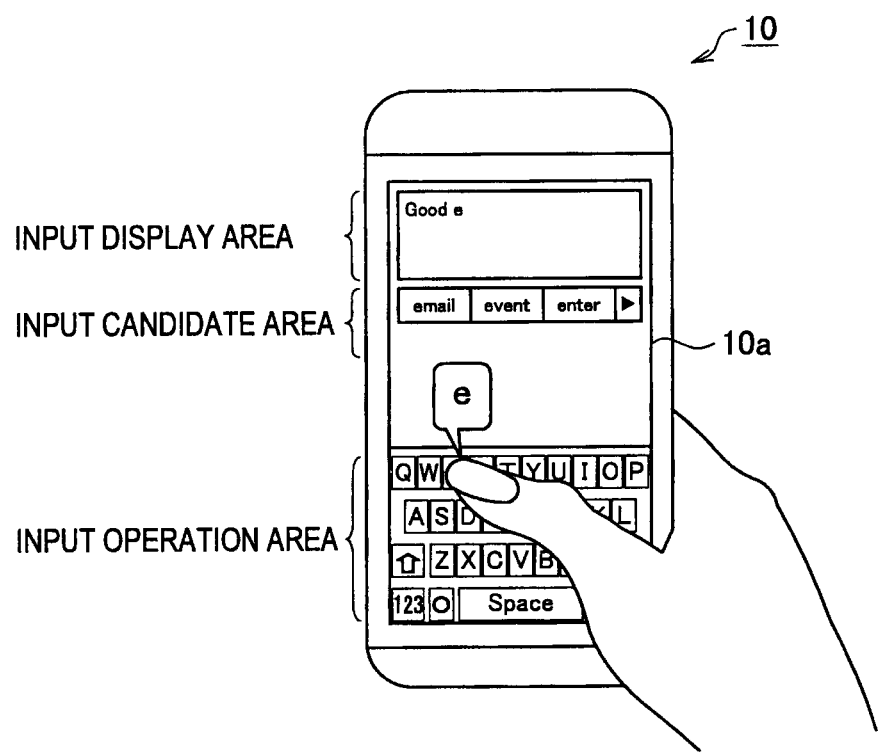
FIG. 1 is a view illustrating operation example 1 for a software keyboard of an electronic device according to a first embodiment of the present disclosure.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments of the present disclosure will be described in the following order:

<Initially>
[Operation example 1 of a software keyboard of an electronic device]
[Operation example 2 of a software keyboard of an electronic device]
[Operation example 3 of a software keyboard of an electronic device]
<First embodiment>
    [1-1. Functional structure of an electronic device]
    [1-2. Operation of an electronic device]
        (Input control process)
    [1-3. Modified example 1]
        (Input control process)
<Second embodiment>
    [2-1. Functional structure of an electronic device]
    [2-2. Operation of an electronic device]
        (Input control process)
    [2-3. Modified example 2]
        (Input control process)
<Third embodiment>
    [3-1. Operation of an electronic device]
        (Input control process)

<Initially>

Figure 3:
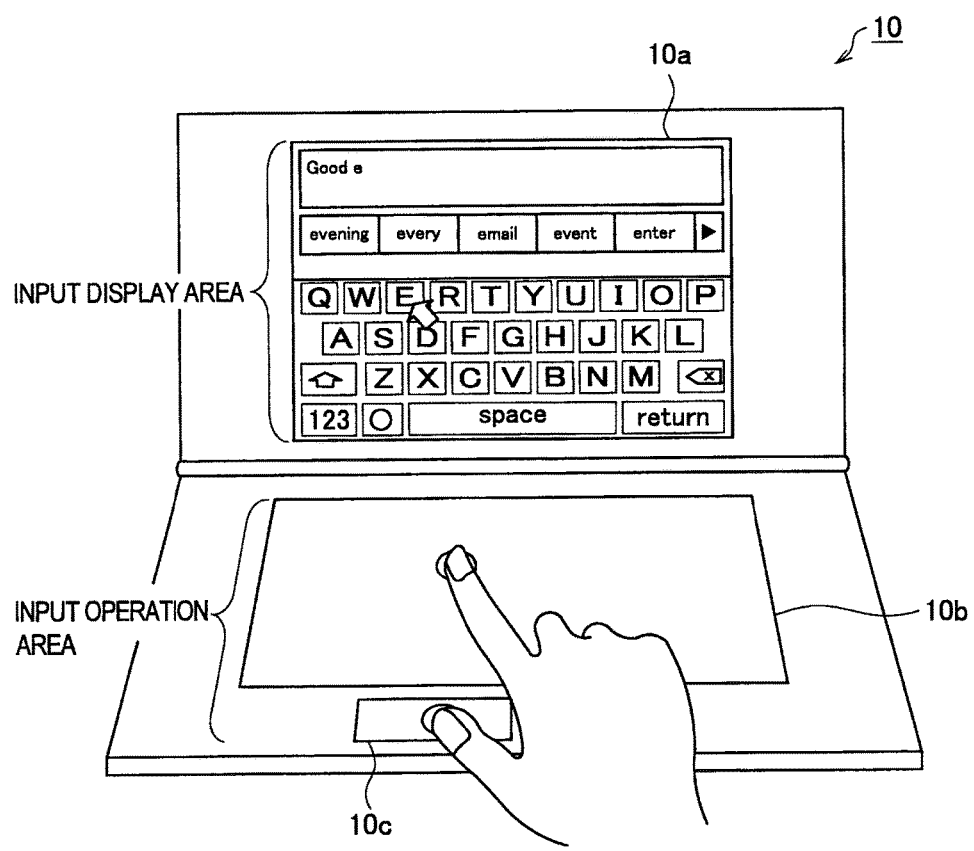
FIG. 3 is a view illustrating operation example 3 for a software keyboard of an electronic device according to a third embodiment of the present disclosure.

The operation examples 1 to 3 of a software keyboard in a touch panel or touch pad will be described with reference to FIGS. 1 to 3, respectively, using three types of electronic devices according to the first to third embodiments of the present disclosure. Referring to FIGS. 1 to 3, an electronic device 10 includes a touch panel (not shown) and a touch screen 10*a* which is provided on the rear side of the touch panel. The electronic device 10 shown in FIGS. 1 and 3 is an example of an information processing apparatus which allows an operator to perform an input operation (i.e., user input) through a touch on the touch screen 10*a*. The electronic device 10 shown in FIG. 2 is an example of an information processing apparatus which allows an operator to perform an input operation through a touch or press on the touch screen 10*a*. Examples of the information processing apparatus may include personal computers (PCs), mobile phones, smart phones, handheld music players, personal digital assistants (PDAs), game machines or digital electrical appliances.

Examples of the touch screen 10*a* may include a liquid crystal display (LCD) and an organic electroluminescence display (OELD).

Operation Example 1 of a Software Keyboard of an Electronic Device

Initially, the operation example 1 of a software keyboard will be described with reference to FIG. 1. In FIG. 1, the touch screen 10*a* of the electronic device 10 includes an input operation area, an input candidate area, and an input display area, which are arranged in this order from the bottom of the screen. In the input operation area, there is a software keyboard, such as a QWERTY keyboard. In the input candidate area, there are input candidates (i.e., objects), such as suggested word candidates expected from entered characters or context or corrected word candidates estimated from mistakenly entered characters. In the input display area, a character or context entered through the input operation is displayed.

In the operation example 1 of a software keyboard, an operator performs a tap operation within the input operation area. For example, a touch panel (not shown) of the touch screen 10*a* is of a capacitive type and detects a touch position of the operator's finger (i.e., an operating member). Based on the detected touch position, a key (i.e., an object) at the detected touch position is input. In FIG. 1, if the operator's finger touches a key 'e' on the software keyboard, the character 'e' is entered and displayed (i.e., an input function is performed) in the input display area. This tap operation is a pattern of reference input operation (key input operation) in the input operation area, which is referred to as 'pattern a'.

The key input is performed through a finger touch on the screen in FIG. 1, but is not limited to this operation. That is, like a remote control of a personal computer or a television, the key input may be performed by a remote-controlled tap input when the touch pad and the display screen are positioned at a distant location. In this case, the touch pad may detect the operator's finger located in close proximity. Accordingly, by displaying a position of the detected adjacent finger on the display screen with a cursor, a point may be selected by the tap input.

Operation Example 2 of a Software Keyboard of an Electronic Device

Next, the operation example 2 of a software keyboard will be described with reference to FIG. 2. In FIG. 2, the touch screen 10*a* of the electronic device 10 also includes an input operation area, an input candidate area, and an input display area, which are arranged in this order from the bottom of the screen.

In the operation example 2 of a software keyboard, the operator performs a press operation within the input operation area. A pressure sensor (not shown) is provided directly beneath the touch screen 10*a*. The pressure sensor includes a pressure-sensitive conductive rubber. The operator touches or presses the input operation area of the touch screen 10*a* with his or her finger to correspond to the software keyboard displayed on the touch screen 10*a*. The touch panel detects a position of the finger touched on the touch screen 10*a*. Further, if the pressure-sensitive conductive rubber is deformed due to the pressure of the finger on the touch screen 10*a*, the pressure sensor detects the pressure by sensing conduction of the deformed part, thereby performing the input of the pressed key. For example, referring to FIG. 2, when the operator's finger is touched on a key 'e' of the software keyboard, the character 'e' is popped up. Subsequently, when the operator's finger further presses down on the key, the character 'e' is entered and displayed in the input display area. This one-point press operation is a pattern of reference input operation (key input operation) in the input operation area, which is referred to as 'pattern b'.

Also in this operation example 2, the key input may be performed by both the input operation by means of a touch on the screen and the input operation by means of a remote control. Further, instead of directly detecting a pressure applied on the touch screen 10a as described above, the pressure may be detected by a hard switch provided directly beneath the touch panel or touch pad.

Operation Example 3 of a Software Keyboard of an Electronic Device

Next, the operation example 3 of a software keyboard will be described with reference to FIG. 3. In FIG. 3, like an operation in a typical note PC, by operating a mouse cursor on the display screen (input display area) using the touch pad 10b in the input operation area and pressing a button 10c in the input operation area, a character pointed by the cursor is input.

In FIG. 3, a touch position of the operator's finger on the touch pad 10b of the touch screen 10a is detected. Based on the detection result, the mouse cursor is moved to a corresponding position 'e' on the software keyboard. In this case, when the operator's another finger presses the button 10c with the mouse cursor placed on the key 'e', the key 'e' is input and the character 'e' is displayed in the input display area. Such a series of tap and button-press operations is a pattern of reference input operation (key input operation) in the input operation area, which is referred to as 'pattern c'.

As can be seen from the examples of the electronic device 10 in FIGS. 1 to 3, the input candidate area is typically provided apart from the input operation area on the touch screen. Accordingly, while performing a typical input operation in the input operation area, the operator selects an input candidate by moving the operator's finger or the cursor to the input candidate area located apart from the input operation area and performing a tap operation, for example. In this manner, the operator frequently moves his or her fingers or the cursor between the input operation area and the input candidate area while performing the input operation. The input operation area takes up most of a space for the operator's finger to be moved as easily as possible. This causes the operator selecting an input candidate to carry a heavy burden since the operator has to move his or her finger to the input candidate area where it is difficult for the operator's finger to be easily moved.

Next, an input control method will be described, which enables an operator to easily select an input candidate without laying a burden on the operator performing an input operation by providing an appropriate size of input operation area in a touch screen 10a using an electronic device 10 according to first to third embodiments.

First Embodiment 1-1. Functional Structure of an Electronic Device

Figure 4:
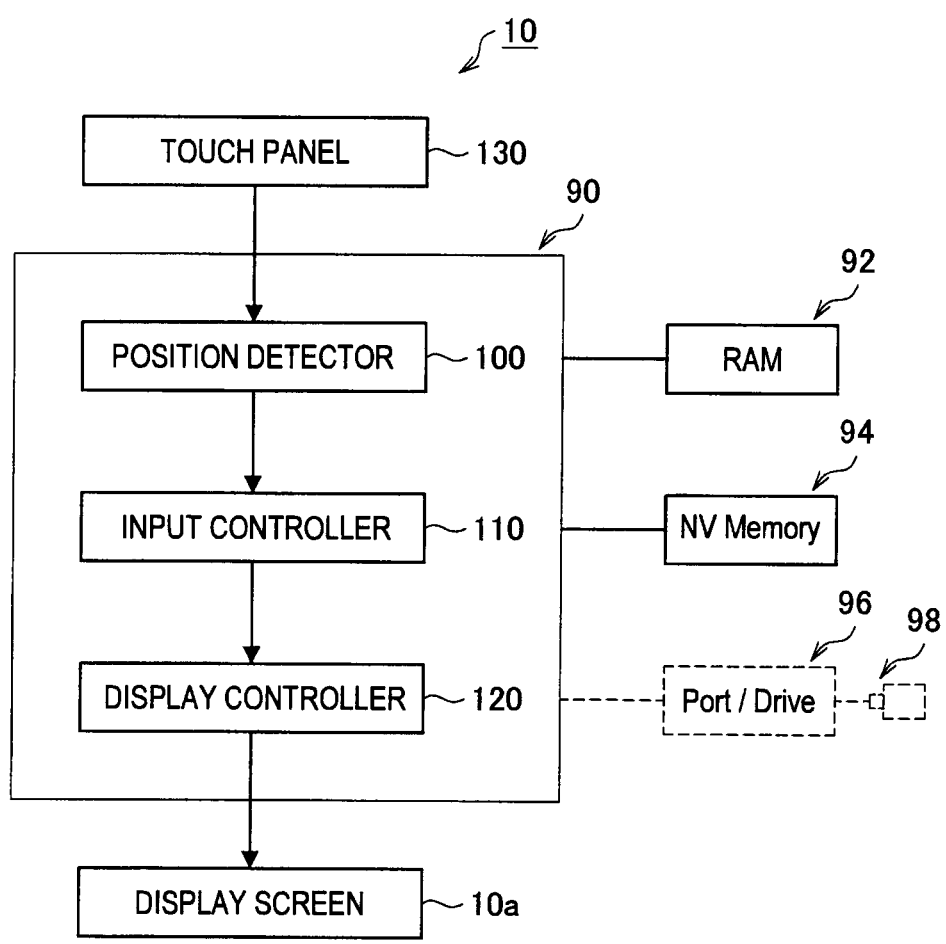
FIG. 4 is a functional block diagram of an electronic device according to the first and third embodiments of the present disclosure.

Firstly, a functional structure of an electronic device 10 according to a first embodiment will be described with reference to FIG. 4. Next, an input control method using the electronic device 10 according to the first embodiment will be described.

The electronic device 10 according to the present embodiment includes a position detector 100, an input controller 110, and a display controller 120. The position detector 100 detects an input operation in an input operation area based on a touch position of an operator's finger on the touch panel 130 of the touch screen 10a. The position detector 100 is an example of a detector which detects an input operation in the input operation area of the touch screen.

The input controller 110 performs an input control in an area other than the input operation area when a particular operation other than a reference input operation in the input operation area is detected. More specifically, when the particular operation is detected, the input controller 110 performs control of an input candidate displayed in an area other than the input operation area.

The display controller 120 performs a display control on the display screen 10a. For example, the display controller 120 displays a desired input character (i.e., an image) in the input display area of the display screen 10a under the input control of the input controller 110. For example, when the operator's finger touches the display screen 10a, the display controller 120 may be configured to pop up a character 'e' at the touch position and, at the same time, to display the character 'e' in the input display area, as shown in FIG. 1. For another example, in performing the press operation of the operator's finger, the display controller 120 may be configured to reverse the pop up of the character 'e' at the pressed position and, at the same time, to display the character 'e' in the input display area, as shown in the bottom of FIG. 2. In addition, the display controller 120 may change a screen display depending on the finger's operation.

The electronic device 10 according to the first to third embodiments includes a CPU, or processor, 90, a RAM 92 and a non-volatile memory 94. Each of the functions of the electronic device 10 is performed by the CPU. The CPU controls the input operation in the electronic device 10 based on the touch position or pressure of the operator's finger which is stored in the RAM and so on. Device 10 may also include a port, or drive, 96 to receive computer-readable media, such as USB stick 98 or disk. CPU 90 may execute instructions stored in RAM 92 and/or non-volatile memory 94 to perform the functions described herein. The instructions may be read from instructions stored on USB stick 98.

1-2. Operation of an Electronic Device (Input Control Process)

Figure 5:
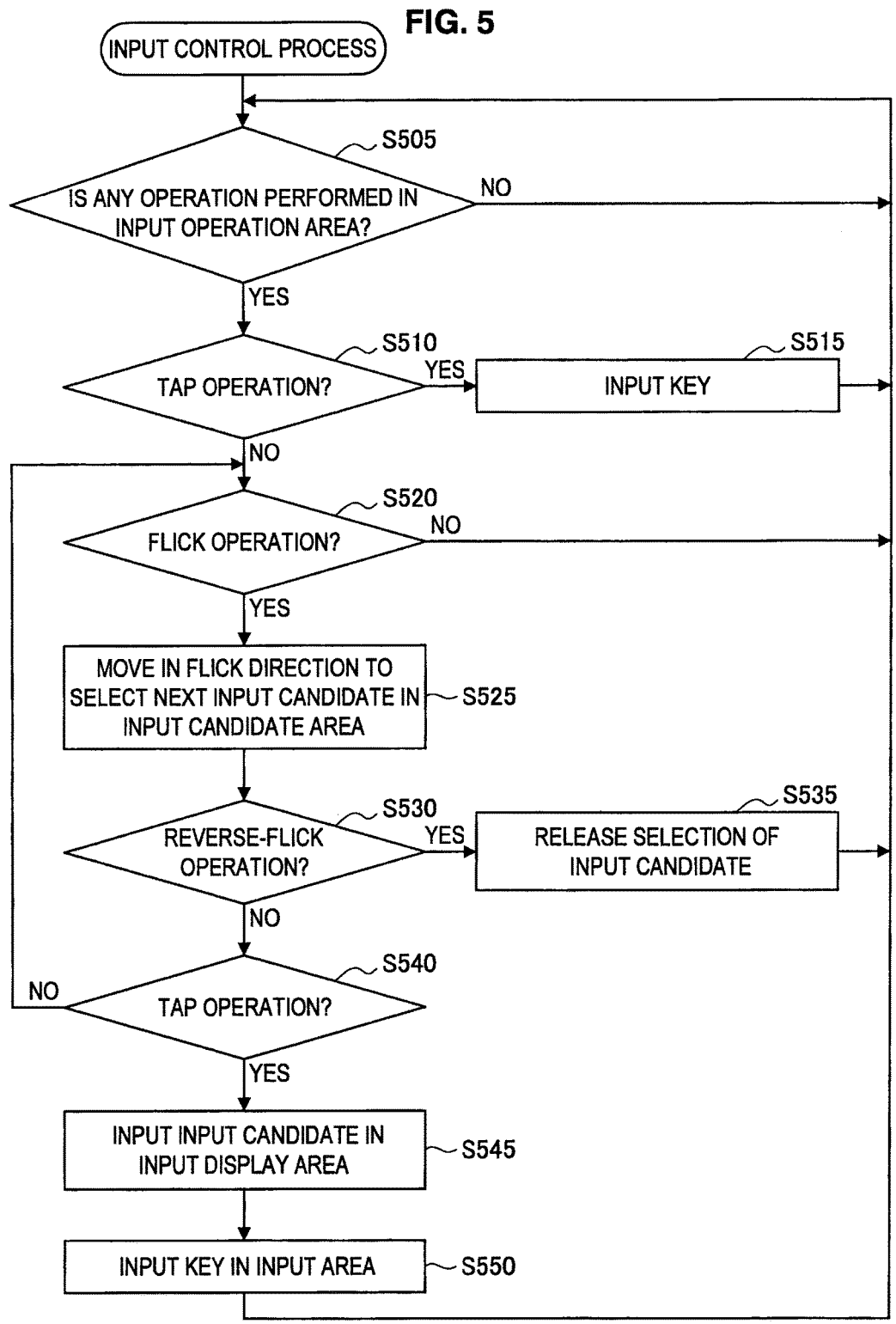
FIG. 5 is a flow chart illustrating an input control process according to the first embodiment of the present disclosure.
Figure 6:
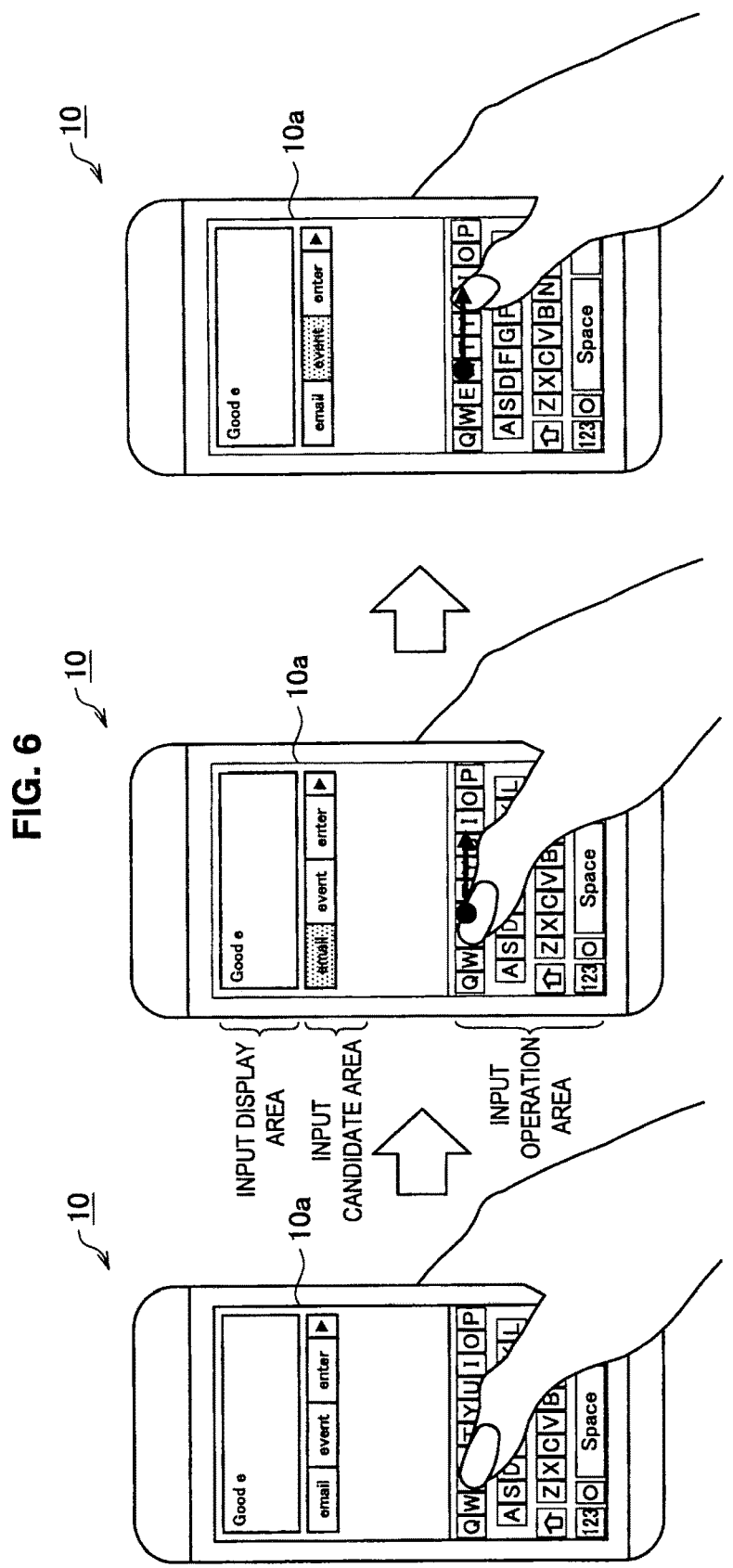
FIG. 6 is a transition view of a display screen corresponding to an input control according to the first embodiment of the present disclosure.

When a particular operation other than the reference input operation ('pattern a') is performed in the input operation area, the electronic device 10 according to the present embodiment determines the particular operation as being a selection operation of an input candidate displayed in the input candidate area and performs an input control accordingly. The input control method will be described with reference to FIGS. 5 and 6. FIG. 5 is a flow chart illustrating an input control process according to the present embodiment. FIG. 6 is a transition view of a display screen corresponding to an input control according to the present embodiment.

The input control process will be described with reference to FIG. 5. Initially, at step S505, the input controller 110 determines whether or not an operation is performed in the input operation area based on a touch position detected by the position detector 100. If no operation is determined to be performed in the input operation area, the step S505 is repeated. If an operation is determined to be performed in the input operation area, the input controller 110 determines at step S510 whether or not the operation in the input operation area is a tap operation. If the operation is determined to be a tap operation, at step S515, the input controller 110 inputs a key located at the touch position of the touch screen 10a. In the left of FIG. 6, the operator's finger performs a tap operation in the input operation area to enter a key 'e' at the touch position. As a result, the character 'e' is displayed in the input display area. The above-mentioned operation is the 'pattern a' of reference input operation (key input operation) in the input operation area.

If the tap operation is determined to be not performed at step S510, the input controller 110 determines at step S520 whether or not the operation in the input operation area is a flick operation. If a flick operation is determined to be not performed, the process returns to the step S505 and restarts from the step S505.

If a flick operation is determined to be performed at step S520, it is considered that an input candidate is intended to be selected. In this case, the process proceeds to the step S525 where the input controller 110 highlights (i.e., modifies) a leading input candidate to indicate that the leading input candidate is selected. Referring to the middle of FIG. 6, when the operator's finger does a right flick in the input operation area, a leading input candidate, 'email', in the input candidate area is highlighted to indicate that the leading input candidate 'email' is selected.

Next, at step S530, it is determined whether or not a reverse-flick operation is performed. If a reverse-flick operation is determined to be performed, at step S535, the input controller 110 releases the selection of the input candidate and terminates the highlight sign of the input candidate. The process then returns to the step S505 and restarts from the step S505.

If a reverse-flick operation is determined to be not performed, the input controller 110 determines at step S540 whether or not a tap operation is performed in the input operation area. If a tap operation is determined to be not performed, the process returns to the step S520 where it is determined whether or not a flick operation is performed in the input operation area. If a flick operation is determined to be further performed, the process proceeds to the step S525 where a next input candidate located next to the leading input candidate in the flick direction is selected in the input candidate area. Referring to the right of FIG. 6, since the operator's finger does a further right flick in the input operation area, a next input candidate, 'event', which is the second from the leading input candidate in the flick direction, is highlighted in the input candidate area to indicate that the next input candidate 'event' is selected.

Next, if a reverse-flick operation is determined to be not performed at the step S530 and a tap operation is determined to be performed at the step S540, the input controller 110 determines at step S545 that the currently selected input candidate is expected to be input. In this case, the input controller 110 inputs and displays the selected input candidate in the input display area. At step S550, the input controller 110 inputs and displays a character corresponding to the tapped key in the input display area. Referring to the right of FIG. 6, since the operator's finger does a right flick and then does a tap operation at a key 'U' in the input operation area, the input candidate 'event', which is the second from the leading input candidate in the input candidate area, and the character 'U' are consecutively input and displayed in the input display area.

In the input control method according to the present embodiment, if a flick operation is detected by the position detector 100, it is determined that a particular operation is performed. In this case, a selection position of an input candidate displayed in an area other than the input operation area is moved according to the flick operation. Accordingly, the operator may select an input candidate while placing his or her fingers in the input operation area where the operator's finger can easily be moved. As a result, it is possible to easily select the input candidate without laying a burden on the operator performing the input operation by providing an appropriate size of input operation area in the touch screen 10a.

In addition, if a left-flick operation is determined to be performed at step S520, the input controller 110 may be configured to move a highlight sign to an earlier-numbered input candidate which is provided to the left in the input candidate area. If a left-flick operation is performed with a first input candidate selected, the input controller 110 may release the highlight sign of the first input candidate to terminate the selection of the first input candidate or may highlight the last input candidate. Display of a selection range of input candidates is automatically changed so that input candidates prior to and subsequent to a highlighted input candidate may be displayed.

In addition, the input controller 110 may cancel the selection of an input candidate if the detected operation is determined as being a release operation of the operator's finger.

1-3. Modified Example 1

(Input Control Process)

Figure 7:
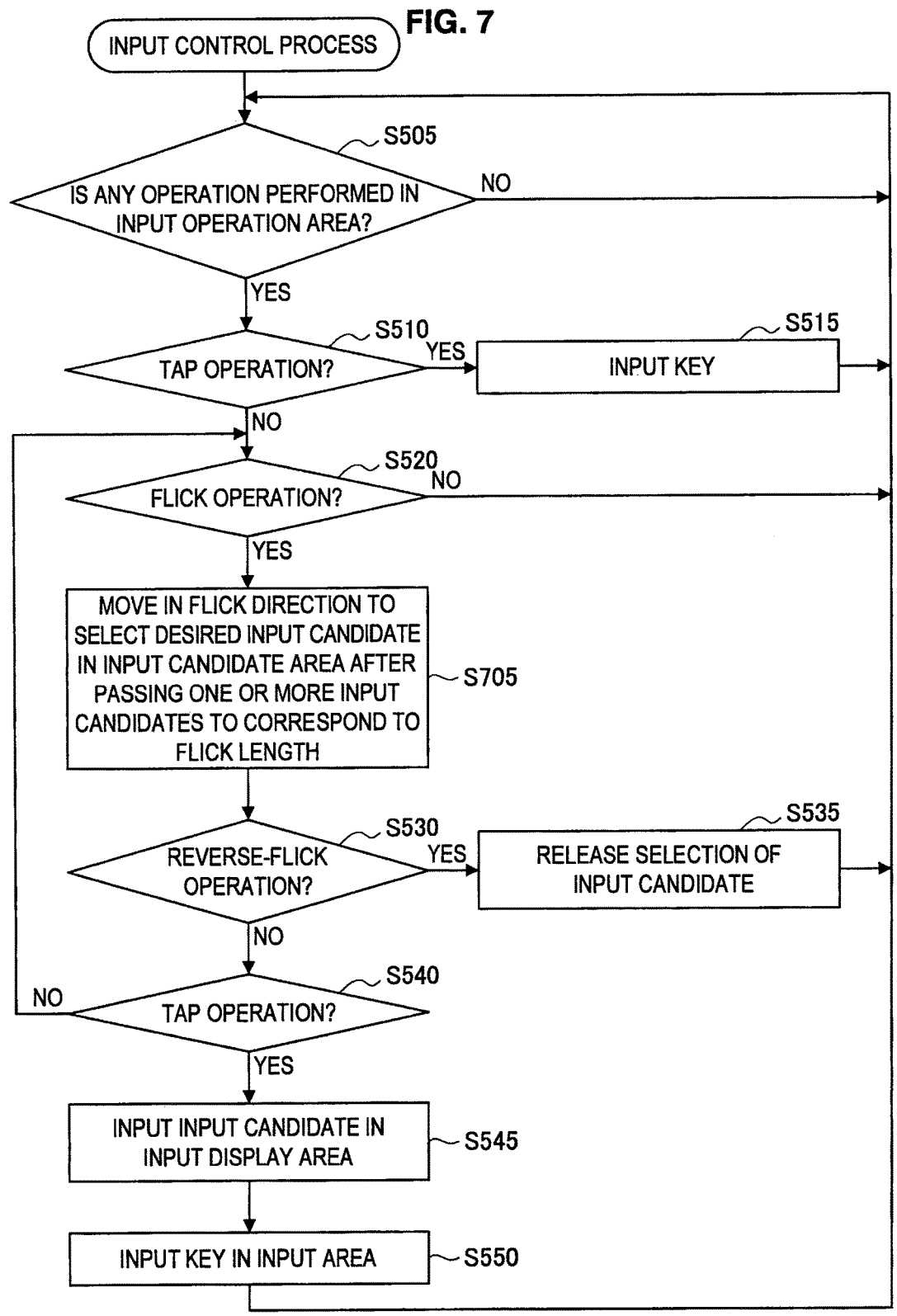
FIG. 7 is a flow chart illustrating an input control process according to modified example 1 of the first embodiment of the present disclosure.
Figure 8:
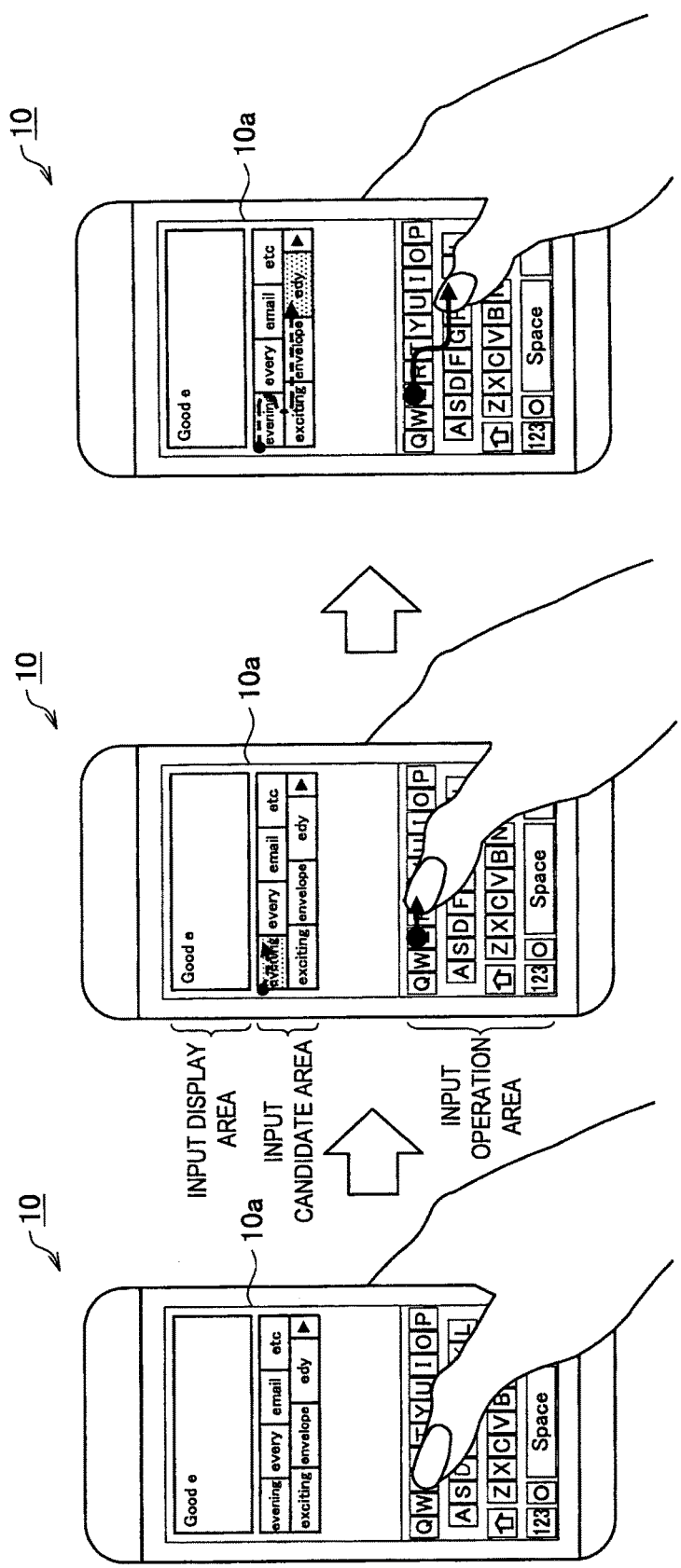
FIG. 8 is a transition view of a display screen corresponding to an input control according to the modified example 1 of the first embodiment of the present disclosure.

Modified example 1 of the first embodiment will be described with reference to FIGS. 7 and 8. FIG. 7 is a flow chart illustrating an input control process according to the modified example 1 of the first embodiment. FIG. 8 is a transition view of a display screen corresponding to an input control according to the modified example 1 of the first embodiment.

The input control process of FIG. 7 is almost the same as the input control process according to the first embodiment shown in FIG. 5, except that the input control process according to the first embodiment includes the step S525 where a selection position of an input candidate is moved depending on the direction and frequency of a flick operation, while the modified example 1 includes a step where a selection position of an input candidate is moved depending on the direction and length of a flick operation. More specifically, the modified example 1 includes step S705 of FIG. 7 instead of the step S525 of FIG. 5 in the first embodiment, where a desired input candidate is selected in an input candidate area after passing one or more input candidates depending on the length of a flick.

For example, while a tap operation is performed as a reference input operation as shown in the left of FIG. 8, a flick operation is performed as shown in the middle of FIG. 8. In this case, when an operator's finger does a right flick in the input operation area, a leading input candidate, 'email', is highlighted in the input candidate area to indicate that the leading input candidate 'email' is selected. Further, when the operator drags his or her finger to the lower-right direction along the arrow line shown in the right of FIG. 8, a desired input candidate is selected in the input candidate area according to the drag operation after passing a plurality of input candidates in the input candidate area along the broken arrow line shown in the right of FIG. 8. As a result, in FIG. 8, an input candidate, 'edy', located at the lower-right side from the leading input candidate in the input candidate area is highlighted to indicate that the input candidate 'edy' is selected.

As such, in the input control method according to the modified example 1, a particular operation in the input operation area is assigned to an operation in the input candidate area. Accordingly, the operator may select a desired input candidate while placing his or her fingers in the input operation area where the operator can easily move his or her fingers. As a result, it is possible to easily select a desired input candidate without laying a burden on the operator performing an input operation by providing an appropriate size of input operation area in the touch screen 10a.

Second Embodiment 2-1. Functional Structure of an Electronic Device

The functional structure of the electronic device 10 according to the second embodiment will be described with reference to FIG. 9. Next, an input control method using the electronic device 10 according to the second embodiment will be described. The electronic device 10 according to the present embodiment includes a position detector 100, an input controller 110, a display controller 120, and a pressure detector 140. Since the position detector 100, the input controller 110, and the display controller 120 are described above in the first embodiment, the pressure detector 140 will be described herein.

The operator touches his or her finger on a predetermined position of the touch screen 10a and performs a press operation to perform an input operation. The pressure detector 140 detects a finger pressure applied on the pressure sensor 150 provided directly beneath the touch screen 10a. The pressure detector is an example of a detector detecting an operation in the input operation area of the touch screen.

2-2. Operation of an Electronic Device

Figure 10:
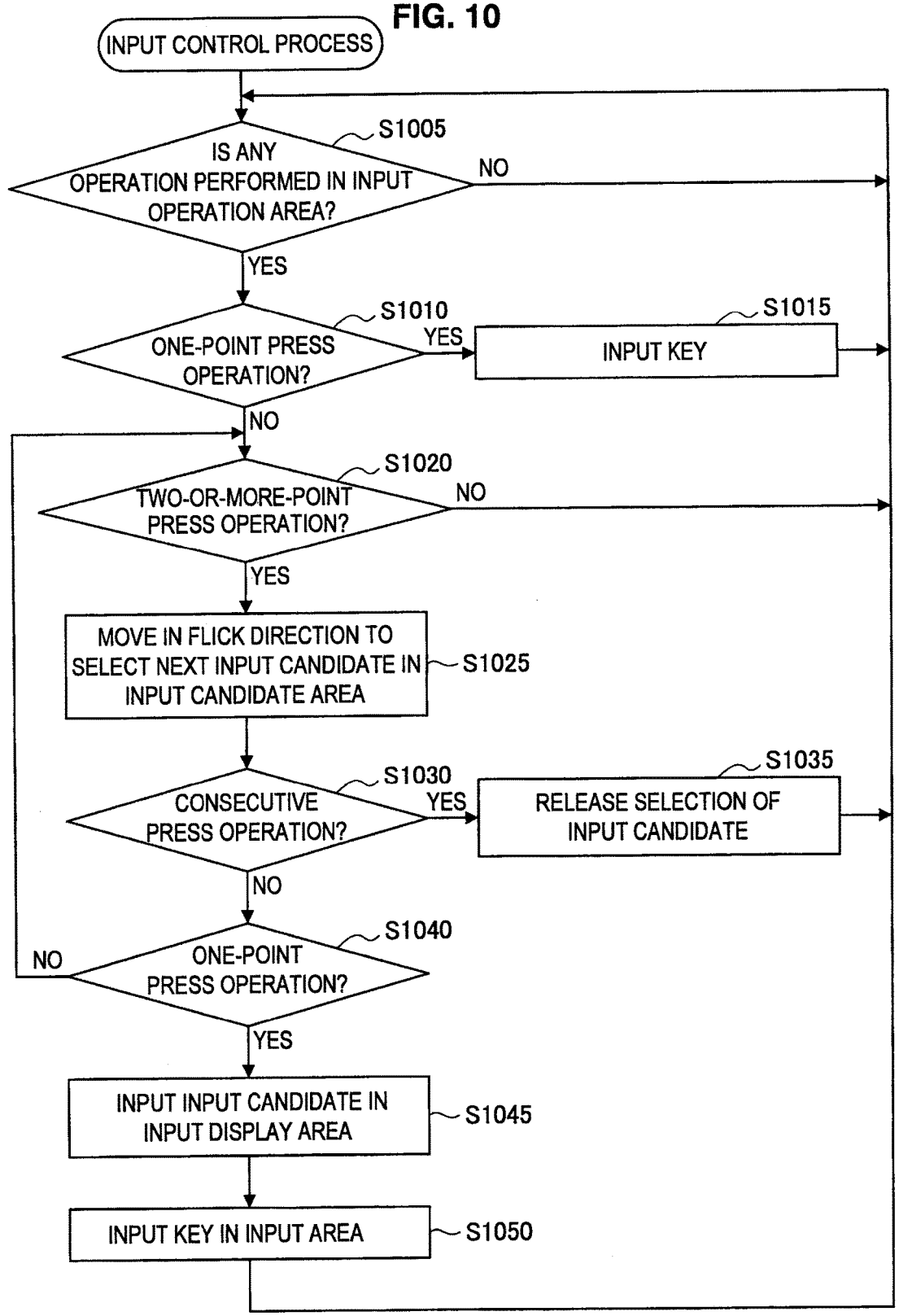
FIG. 10 is a flow chart illustrating an input control process according to the second embodiment of the present disclosure.
Figure 11:
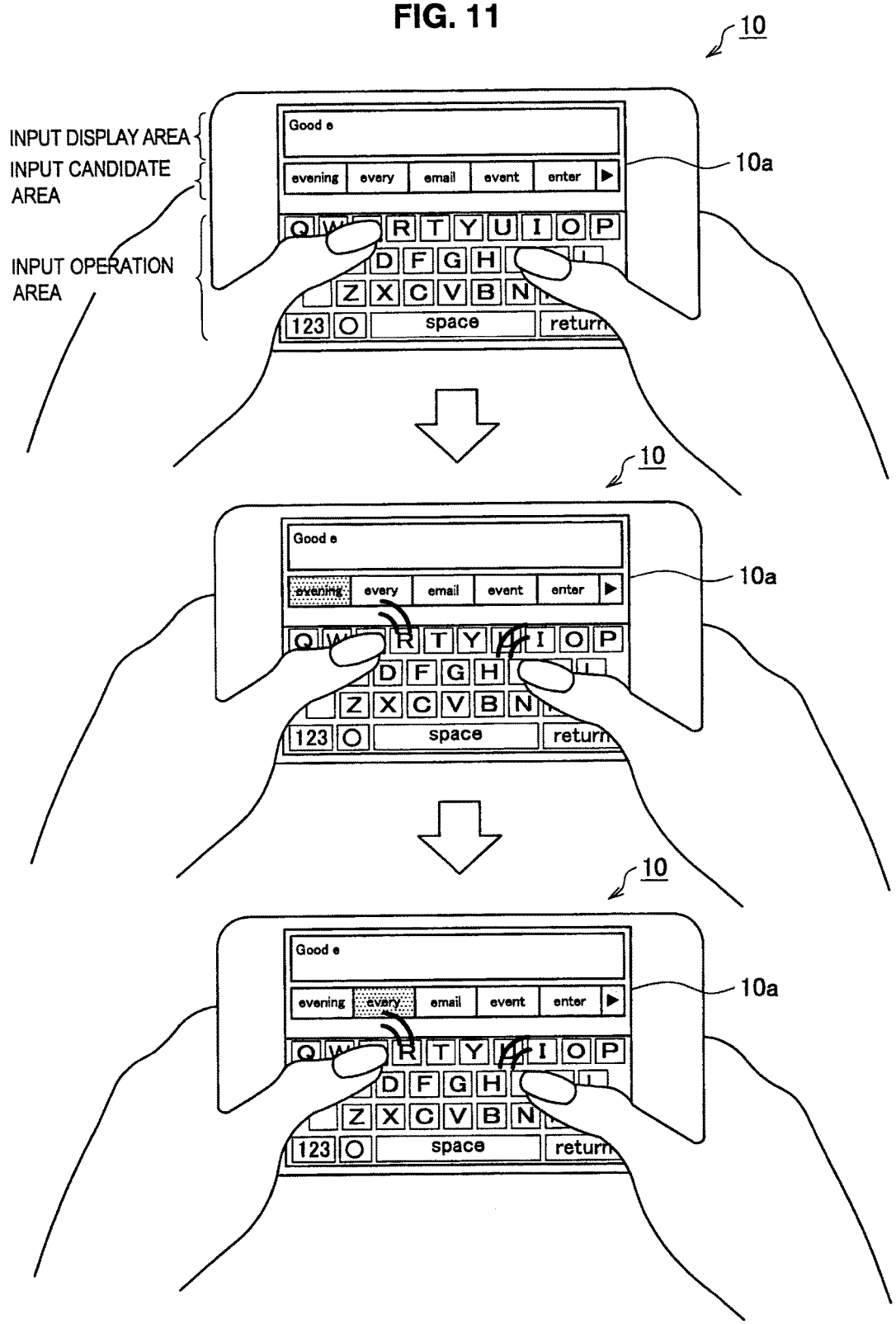
FIG. 11 is a transition view of a display screen corresponding to an input control according to the second embodiment of the present disclosure.

Next, the input control method of the electronic device 10 according to the second embodiment will be described with reference to FIGS. 10 and 11. FIG. 10 is a flow chart illustrating an input control process according to the present embodiment. FIG. 11 is a transition view of a display screen corresponding to an input control according to the present embodiment. If a particular operation other than the reference input operation ('pattern b') is performed in the input operation area, the electronic device 10 according to the present embodiment determines the particular operation as being a selection operation of an input candidate displayed in the input candidate area and performs an input control accordingly.

(Input Control Process)

The input control process will be described with reference to FIG. 10. Initially, at step S1005, the input controller 110 determines whether or not any operation occurs in the input operation area based on a pressure detected by the pressure detector 140. If no operation is determined to occur, the step S1005 is repeated. If any operation is determined to occur, the input controller 110 determines at step S1010 whether or not a one-point press operation is performed in the input operation area. If a one-point press operation is determined to be performed, at step S1015, the input controller 110 enters a key at the pressed position on the touch screen 10a. As shown in FIG. 11, when the key input is performed with two fingers, the press operation is performed with any one of the two fingers. Referring to the top of FIG. 11, the operator's left finger performs a one-point press operation in the input operation area. In this case, a key 'e' at the pressed position is entered and displayed in the input display area. The above-mentioned operation is the 'pattern b' of reference input operation (key input operation) in the input operation area.

If a one-point press operation is determined to be not performed at the step S1010, the input controller 110 determines at step S1020 whether or not a two-or-more-point press operation (press-flick operation) is performed in the input operation area. If it is determined that the two-or-more-point press operation is not performed, the process returns to the step S1005 and restarts from the step S1005.

If a two-or-more-point press operation is determined to be performed at the step S1020, it is considered that an input candidate is intended to be selected and the process proceeds to step S1025 where the input controller 110 highlights a leading input candidate to indicate that the leading input candidate is selected. Referring to the middle of FIG. 11, the operator performs the two-point press operation with fingers of his or her both hands in the input operation area. In this case, the leading input candidate, 'evening', is highlighted in the input candidate area to indicate that the input candidate 'evening' is selected.

Next, at step S1030, it is determined whether or not the operator performs a consecutive press operation with his or her two fingers. If a consecutive press operation is determined to be performed, at step S1035, the input controller 110 releases the selection of the input candidate and terminates the highlight sign of the input candidate. The process then returns to the step S1005 and restarts from the step S1005.

If a consecutive press operation is determined to be not performed, the input controller 110 determines at step S1040 whether or not a one-point press operation is performed in the input operation area. If it is determined that a one-point press operation is not performed, the process returns to the step S1020 where it is determined whether or not a two-or-more-point press operation is performed in the input operation area. If a two-or-more-point press operation is further performed, the process proceeds to the step S1025 where a next input candidate located next to the leading input candidate in the flick direction is selected in input candidate area. Referring to the bottom of FIG. 11, since the operator further performs a two-or-more-point press operation with his or her finger in the input operation area, a next input candidate, 'every', which is the second from the leading input candidate in the flick direction, is highlighted in the input candidate area to indicate that the next input candidate 'every' is selected.

Next, if the consecutive press operation is determined to be not performed at the step S1030 and the one-point press operation is determined to be performed at the step S1040, the input controller 110 determines at step S1045 that the currently selected (highlighted) input candidate is expected to be input. In this case, the input controller 110 inputs and displays the selected input candidate in the input display area. At step S1050, the input controller 110 inputs a character corresponding to a key at the pressed position according to the one-point press operation and displays the character in the input display area.

On the other hand, in the present embodiment, the consecutive press operation indicates an operation of successively pressing keys without a break, like a double-click operation of a mouse. Hence, the consecutive press operation is different from the two-or-more-point press operation.

As such, in the input control method according to the present embodiment, if a two-point press operation is detected by the pressure detector 140, it is determined that a particular operation is performed. In this case, a selection position of an input candidate displayed in an area other than the input operation area is moved according to the two-point press operation. Accordingly, the operator may select a desired input candidate while placing his or her fingers in the input operation area where the operator can easily move his or her fingers. As a result, like the first embodiment, it is possible to easily select an input candidate without laying a burden on the operator performing an input operation by providing an appropriate size of input operation area in the touch screen 10a.

In the present embodiment, the selection of the input candidate is released when the consecutive press operation is performed at the step S1030. However, the present embodiment is not limited thereto. For example, when a consecutive press operation is performed, it may be determined that it is intended to move in the opposite direction in a list of input candidates. In this case, an input candidate located in the opposite direction in the list of input candidates may be highlighted.

The particular operation in the second embodiment may be a two-or-more-point press operation or a two-or-more-point press-flick operation. Accordingly, if a two-or-more-point press operation or a two-or-more-point press-flick operation is determined to be performed, the particular operation is determined to be performed. In this case, a selection position of an input candidate may be moved according to the direction of the particular operation, the frequency of the particular operation, or the length of the particular operation.

2-3. Modified Example 2

(Input Control Process)

Figure 12:
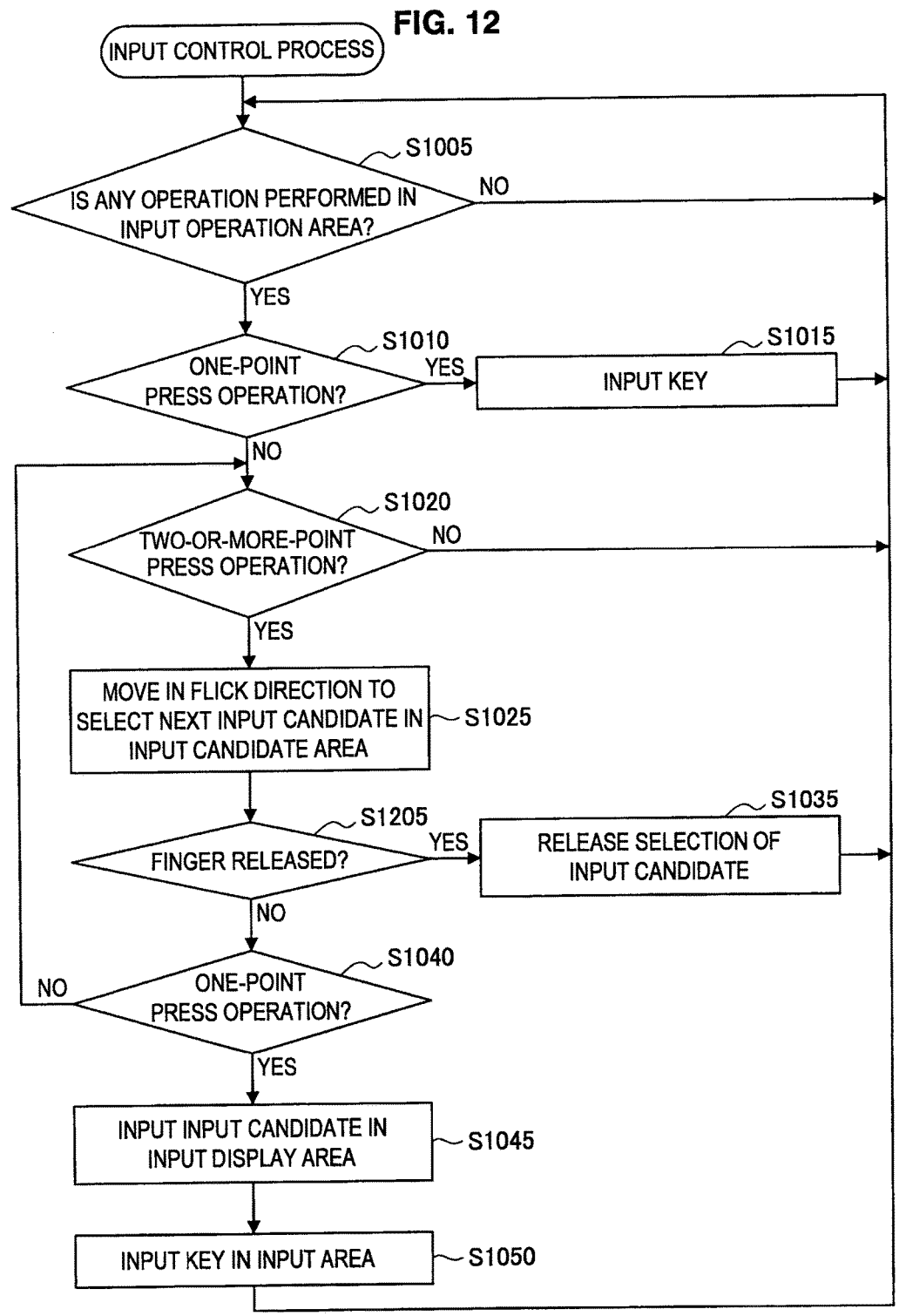
FIG. 12 is a flow chart illustrating an input control process according to modified example 2 of the second embodiment of the present disclosure.
Figure 13:
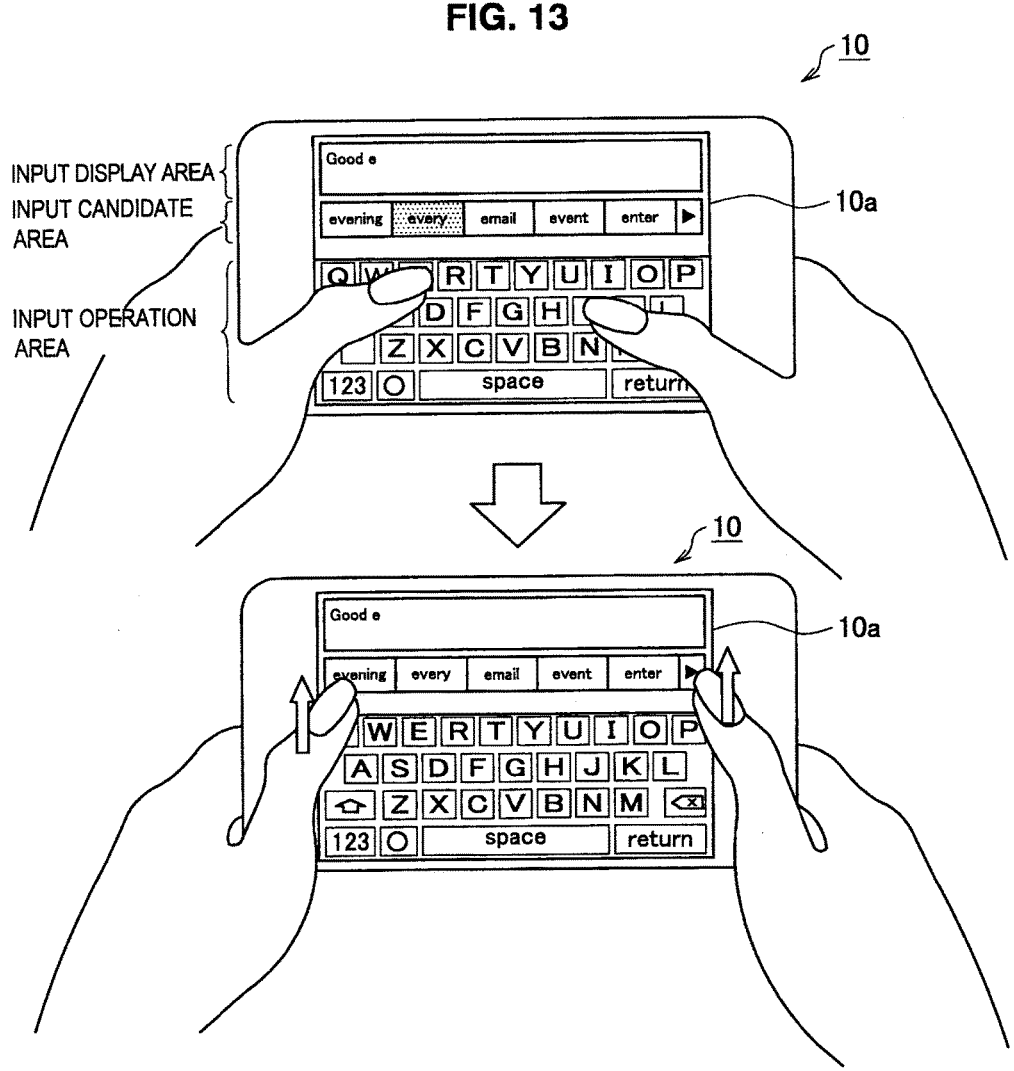
FIG. 13 is a transition view of a display screen corresponding to an input control according to the modified example 2 of the second embodiment of the present disclosure.

Modified example 2 of the second embodiment will be described with reference to FIGS. 12 and 13. FIG. 12 is a flow chart illustrating an input control process according to the modified example 2 of the second embodiment. FIG. 13 is a transition view of a display screen corresponding to an input control according to the modified example 2 of the second embodiment.

Figure 9:
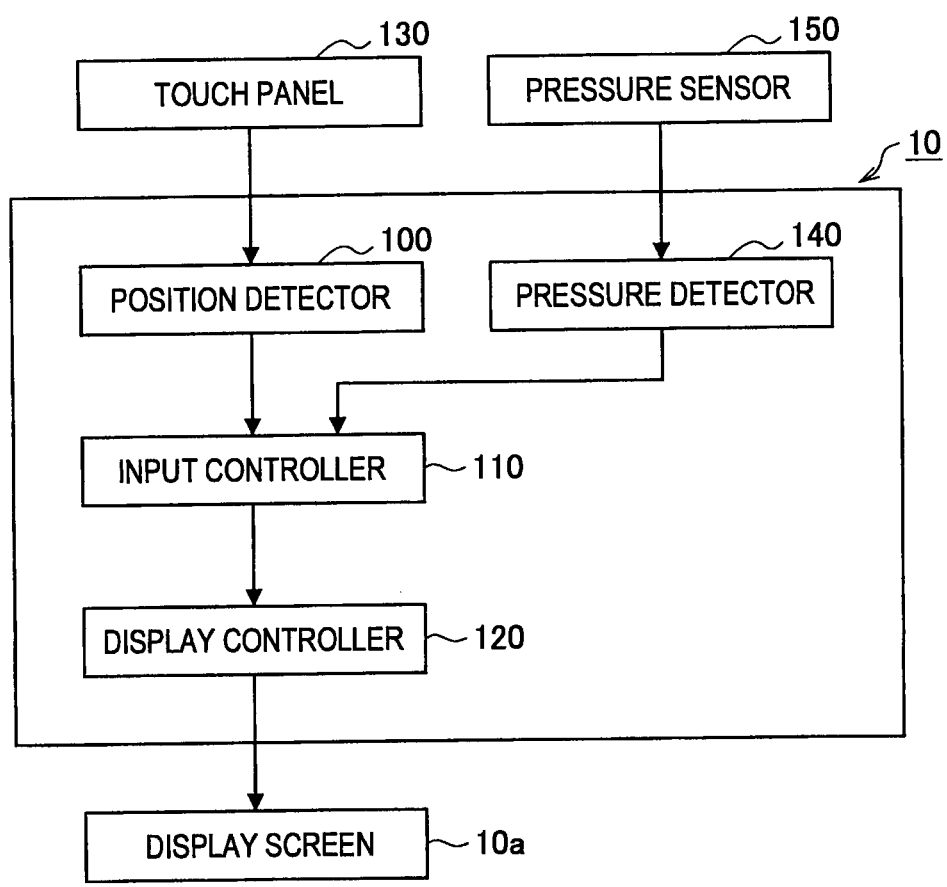
FIG. 9 is a functional block diagram of an electronic device according to a second embodiment of the present disclosure.

The input control process of FIG. 12 is almost the same as the input control process according to the first embodiment shown in FIG. 9, except that FIG. 10 of the second embodiment includes the step S1030 where the consecutive press operation is performed, while FIG. 12 includes step S1205 where the selection of an input candidate is released when fingers of the operator's both hands are released from a display surface.

For example, when fingers of the operator's both hands are released as shown in the bottom of FIG. 13 while a two-point press operation is performed with the fingers of the operator's both hands as shown in the top of FIG. 13, it is determined that a selection of an input candidate is intended to be stopped. In this case, the highlight sign of the input candidate is released to stop the selection of the input candidate.

As such, in the input control method according to the modified example 2, a particular operation in the input operation area is assigned to an operation in the input candidate area. Accordingly, the operator may select a desired input candidate while placing his or her fingers in the input operation area where the operator can easily move his or her fingers. As a result, it is possible to easily select an input candidate without laying a burden on the operator performing an input operation by providing an appropriate size of input operation area in the touch screen 10a.

Third Embodiment 3-1. Hardware Configuration of an Electronic Device

Finally, an input control method using an electronic device 10 according to a third embodiment will be described. The function of the electronic device 10 according to the present embodiment is almost the same as that of the electronic device 10 according to the first embodiment shown in FIG. 4 and a detailed description thereof will thus be omitted herein. The function of the electronic device 10 according to the present embodiment may be the same as that of the electronic device 10 according to the second embodiment shown in FIG. 9.

3-2. Operation of an Electronic Device (Input Control Process)

Figure 14:
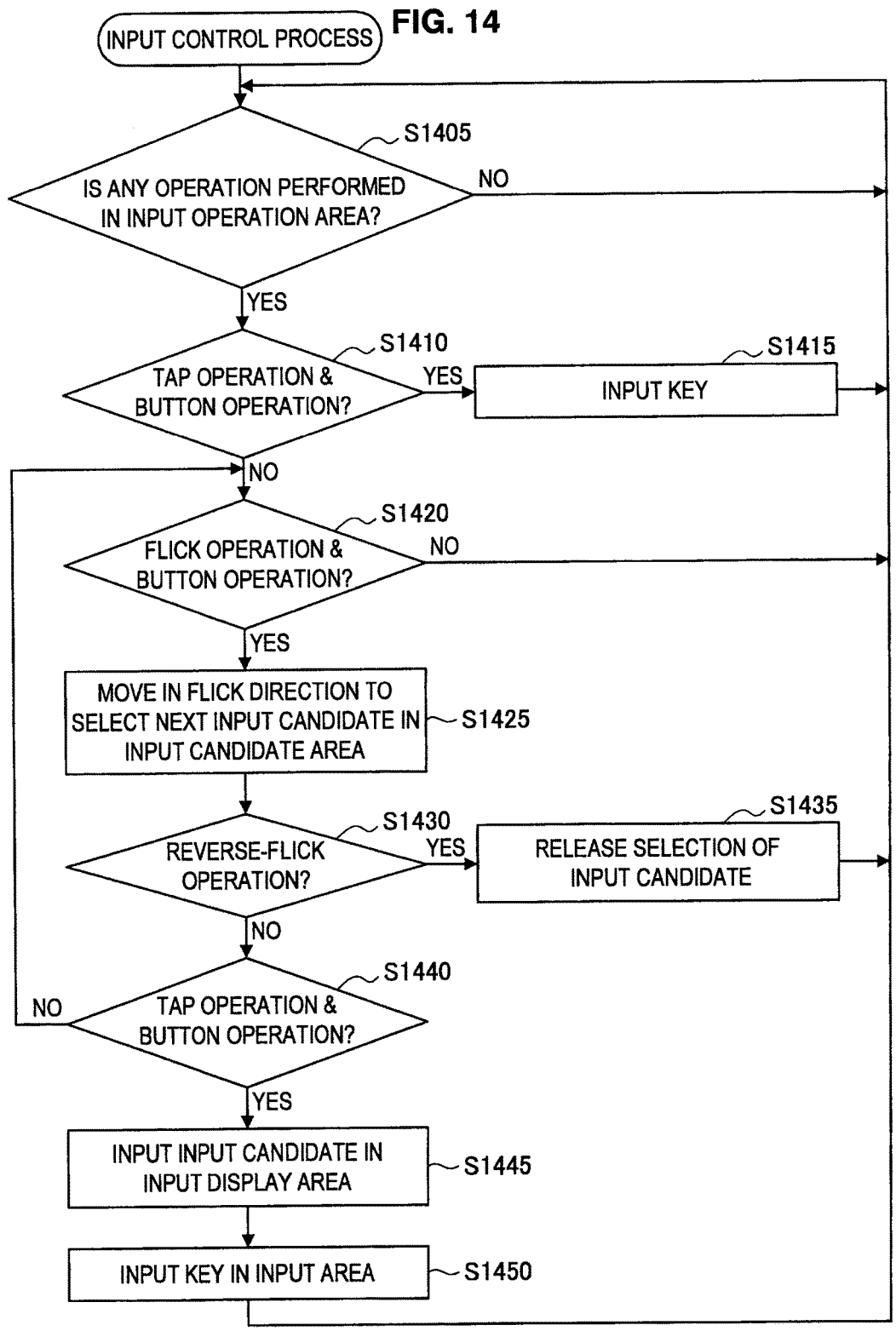
FIG. 14 is a flow chart illustrating an input control process according to a third embodiment of the present disclosure.
Figure 15:
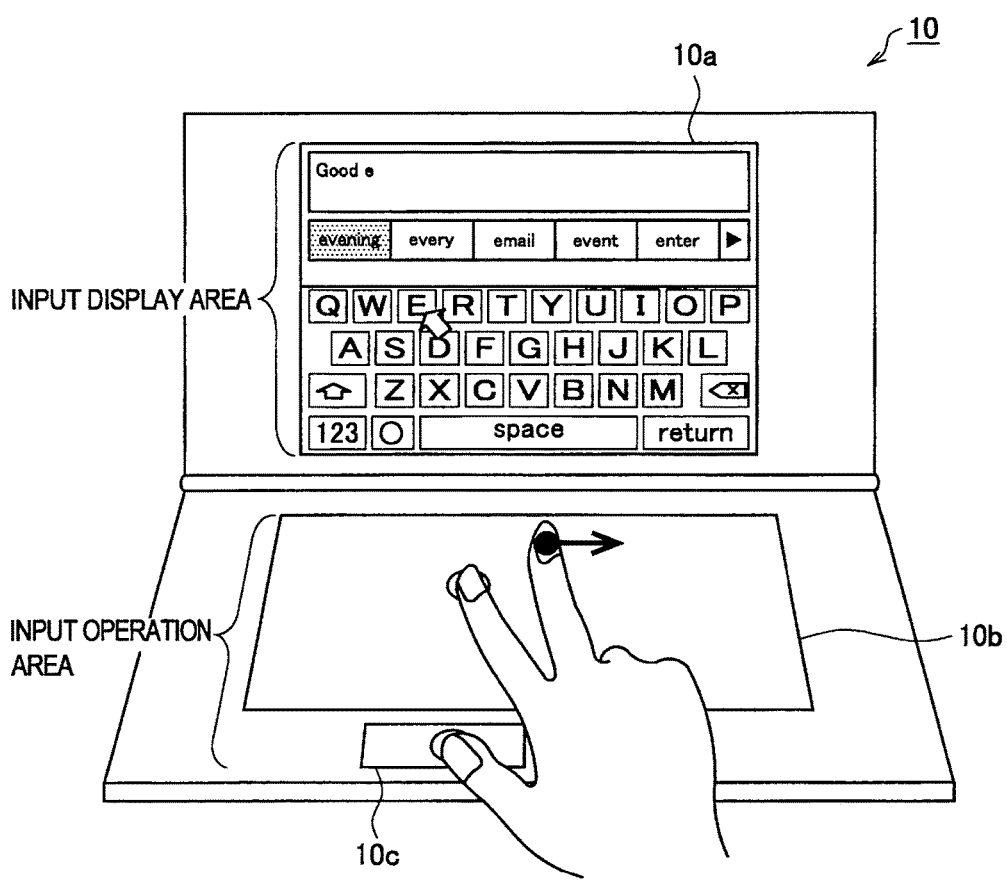
FIG. 15 is a transition view of a display screen corresponding to an input control according to the third embodiment of the present disclosure.

If a particular operation other than the reference input operation ('pattern c') is performed in the input operation area, the electronic device 10 according to the present embodiment determines the particular operation as being a selection operation of an input candidate displayed in the input candidate area and performs an input control accordingly. The input control method will be described with reference to FIGS. 14 and 15. FIG. 14 is a flow chart illustrating an input control process according to the present embodiment. FIG. 15 is a transition view of a display screen corresponding to an input control according to the present embodiment.

The input control process will be described with reference to FIG. 14. Initially, at step S1405, the input controller 110 determines whether or not any operation is performed in the input operation area based on a touch position detected by the position detector 100. If no operation is determined to be performed in the input operation area, the step S1405 is repeated. If any operation is determined to be performed in the input operation area, the input controller 110 determines at step S1410 whether or not the operation in the input operation area is a combination of a tap operation and a button operation. If the operation is determined to be a combination of the tap operation and the button operation, at step S1415, the input controller 110 inputs a key at the touch position of the touch screen 10a. Referring to FIG. 15, using the touch pad 10b in the input operation area, the operator performs a tap operation with his or her index finger to move a cursor to a desired key 'e' and clicks on a button 10c with his or her thumb. As a result, a character 'e' is input and displayed in the input display area. The above-mentioned operation is the 'pattern c' of reference input operation (key input operation) in the input operation area.

If a combination of the tap operation and the button operation is determined to be not performed at step S1410, the input controller 110 determines at step S1420 whether or not the operation in the input operation area is a combination of a flick operation and a button operation. If a combination of the flick operation and the button operation is determined to be not performed at the step S1420, the process returns to the step S1405 and restarts from the step S1405.

At step S1420, if a flick operation is performed with a finger other than the index finger moving the mouse cursor and a button operation is performed with the thumb, it is considered that an input candidate is intended to be selected. In this case, the process proceeds to the step S1425 where the input controller 110 highlights a leading input candidate to indicate that the leading input candidate is selected.

Next, at step S1430, it is determined whether or not a reverse-flick operation is performed. If a reverse-flick operation is performed with the operator's middle finger, the input controller 110 releases the selection of the input candidate at step S1435 to stop highlighting the input candidate. The process then returns to the step S1405 and restarts from the step S1405.

If a reverse-flick operation is determined to be not performed, the input controller 110 determines at step S1440 whether or not a combination of a tap operation and a button operation is performed in the input operation area. If a combination of the tap operation and the button operation is determined to be not performed, the process returns to the step S1420 where it is determined whether or not the operation in the input operation area is a combination of a flick operation and a button operation. If a combination of the flick operation and the button operation is determined to be performed, the process proceeds to the step S1425 where the input controller 110 highlights a next input candidate located next to the leading input candidate in the flick direction to indicate that the next input candidate is selected. Referring to FIG. 15, by performing the right-flick operation with the operator's middle finger and performing the press operation of the button 10c with the operator's thumb, the highlight sign of an input candidate in the input candidate area is moved in the right direction.

Next, if a flick operation is determined to be not performed at the step S1430 and a combination of a tap operation and a button operation is determined to be performed at the step S1440, the input controller 110 determines at step S1445 that the currently selected input candidate is intended to be input. In this case, the input controller 110 inputs the selected input candidate and displays the selected input candidate in the input display area. Further, the input controller 110 inputs a character pointed by the cursor through the tap operation and displays the character in the input display area.

As such, in the input control method according to the present embodiment, if an operation detected by the position detector 100 is determined as being a two-or-more-point operation including flick operation, the detected operation is determined as being the particular operation. In this case, a selection position of an input candidate displayed an area other than the input operation area is moved according to the flick operation. Accordingly, the operator may select a desired input candidate while placing his or her fingers in the input operation area where the operator can easily move his or her fingers. As a result, it is possible to easily select an input candidate without laying a burden on the operator performing an input operation by providing an appropriate size of input operation area in the touch screen 10a.

Further, if a combination of a left-flick operation and a button operation is determined to be performed at the step S1420, the input controller 110 may move a highlight sign to an earlier-numbered input candidate which is provided to the left in the input candidate area. If a left-flick operation is performed with a first input candidate selected, the input controller 110 may release the highlight sign of the input candidate to stop the selection of the input candidate or may move the highlight sign to the last input candidate among a list of input candidates. Display of a selection range of input candidates is automatically changed so that input candidates prior to and subsequent to a highlighted input candidate may be displayed. The input controller 110 may cancel the selection of the input candidate if the detected operation is determined as being a release operation of the operator's finger.

Further, by tapping a pad surface with a finger other than a finger moving a mouse cursor or clicking on a button with two fingers placed on the pad, it is possible to move the selection (highlight sign) of an input candidate.

If a two-or-more-point operation including flick operation is performed, a particular operation is determined to be performed. In this case, a selection position of an input candidate may be moved according to the direction of the flick operation, the frequency of the flick operation, or the length of the flick operation.

Also in this case, when it is determined that a selected input candidate is intended to be input while the operator clicks on a key with his or her finger, a highlighted input candidate is input and displayed in the input display area and a character corresponding to a pressed key is input and displayed in the input display area. Further, in all of the above-described embodiments, as a method of moving a highlight sign back to a prior input candidate, a reverse-flick operation, a double-tap operation, or a right-button click operation may be performed with a finger other than a finger moving a cursor.

Accordingly, in the input control method using the electronic device 10 according to each of the embodiments, regardless of which of the patterns a, b and c is employed, the operator may select an input candidate in an area other than the input operation area while placing his or her fingers or a mouse cursor in the input operation area. This may lift a burden from the operator performing an input operation.

Further, when an input candidate provided in an area other than the input operation area is selected by a tap operation, an unwanted word may be mistakenly input due to a tapping error. In this case, an additional operation of entering a desired word may need to be performed after eliminating the unwanted word. However, in the input control method using the electronic device 10 according to each of the embodiments, a selected input candidate may be recognized and determined by moving the highlight sign to a desired input candidate. Accordingly, it is possible to reduce the risk of making the mistake of selecting an unwanted input candidate.

Further, since both the input operation area and the input candidate area need not to be provided in an area where the operator's fingers can be easily moved, it is possible to make the input operation area as large as possible. Accordingly, it is possible to reduce the risk of making the mistake of inputting an unwanted key, thereby performing a correct and fast input operation.

In general, when the operator performs a tap operation in the input operation area, a key at a detected touch position of the operator's finger is input. If a left-flick operation is performed in the same input operation area while such a key input operation is performed, an input operation other than a typical key input may be performed. For example, if a left-flick operation is performed in the same input operation area during a tap operation, a backspace key may be executed as an input operation. Further, if a right-flick operation is performed in the same input operation area during a tap operation, an enter key may be executed as an input operation.

In the first to third embodiments, the operations of each of the elements are correlated with each other. Accordingly, the operations may be replaced as a series of operations and a series of processes considering the correlation thereof. In this case, the embodiment of the information processing apparatus may be implemented as an embodiment of an input control method of the information processing apparatus and as an embodiment of a program configured to implement the functions of the information process apparatus on a computer.

Although preferred embodiments of the present disclosure are described in detail with reference to the appended drawings, the present technology is not limited thereto. It should be understood by those skilled in the art that various modifications, combinations, sub-combinations and alterations may occur depending on design requirements and other factors insofar as they are within the scope of the appended claims or the equivalents thereof.

For example, the present technology may be applied to the operation of an electronic device having a screen and an operation area which are located at a distant area, such as a remote control using a touch pad, as well as an electronic device having a touch panel, such as a mobile phone.

Furthermore, the input information used in the input operation according to the present disclosure includes numerals and symbols as well as characters, such as katakana, hiragana, Chinese characters, and English characters.

What is claimed is:

1. An apparatus for modifying an input area, the apparatus comprising:
   a memory; and
   a processor executing instructions stored in the memory to:
   display a first input area on a device;
   detect a user input in a second input area of a touch screen, wherein the second input area comprises a plurality of objects being displayed thereon;
   perform, when the user input comprises a first operation of a one-point tap operation selecting one of the displayed objects of the second input area, an input function corresponding to the selected object, wherein the first input area displays, concurrently in time, a plurality of input candidates which are estimated based on the first operation;
   modify, when the user input comprises a second operation of an at-least-two point flick operation made upon at least one of the displayed objects of the second input area, the first input area in accordance with a processing that is selected based on a direction of the flick operation; and
   select a desired one of the displayed input candidates based on the direction of the flick operation,
   wherein, when the second operation is a left-flick operation, the processing is an execution of a backspace as an input operation so as to revert the performance of the input function corresponding to the selected object.

2. The apparatus of claim 1, wherein the first input area comprises additional objects displayed thereon.

3. The apparatus of claim 2, wherein modifying the first input area comprises modifying one of the additional objects.

4. The apparatus of claim 3, wherein modifying one of the additional objects comprises highlighting the object.

5. The apparatus of claim 2, wherein the additional objects represent words.

6. The apparatus of claim 1, wherein the second input area is located on the device.

7. The apparatus of claim 1, wherein the second input area is separated from the device and within a distance of the device.

8. The apparatus of claim 1, wherein the plurality of displayed objects represent characters.

9. The apparatus of claim 1, wherein the first operation comprises an operating member touching one of the plurality of displayed objects.

10. The apparatus of claim 9, wherein performing the input function comprises displaying an image in a third input area, the image corresponding to the object touched by the member.

11. The apparatus of claim 1, wherein the second operation comprises an operating member in moving contact with the second input area.

12. The apparatus of claim 1, wherein the second operation is a swipe gesture.

13. The apparatus of claim 1, wherein the first input area is modified by shifting a content displayed in the first input area based on the second operation.

14. The apparatus of claim 1, wherein each one of the displayed objects of the second input area corresponds to only one respective unique character.

15. The apparatus of claim 1, wherein the second operation does not select any character associated with the selected one of the displayed objects that is selected by the first operation.

16. The apparatus of claim 1,
   wherein, upon the selection of one of the displayed objects of the second input area, the selected one of the displayed objects is further displayed within an input display area of the device, and
   wherein, upon the selection of the desired one of the displayed input candidates, the selected desired one of the displayed input candidates is further displayed within the input display area of the device.

17. The apparatus of claim 16, wherein the selected desired one of the displayed input candidates is displayed within the input display area of the device in sequence at a position within the input display area adjacent to the display of the selected one of the displayed objects.

18. The apparatus of claim 1,
   wherein the second operation of the at-least-two point flick operation selects between two or more displayed input candidates that are concurrently displayed, at a time the flick operation is initiated, to be linearly aligned.

19. A method for modifying an input area, comprising:
   displaying a first input area;
   detecting a user input in a second input area of a touch screen, wherein the second input area comprises a plurality of objects being displayed thereon;
   performing, when the user input comprises a first operation of a one-point tap operation selecting one of the displayed objects of the second input area, an input function corresponding to the selected object, wherein the first input area displays, concurrently in time, a plurality of input candidates which are estimated based on the first operation;
   modifying, when the user input comprises a second operation of an at-least-two point flick operation made upon at least one of the displayed objects of the second input area, the first input area in accordance with a processing that is selected based on a direction of the flick operation; and
   selecting a desired one of the displayed input candidates based on the direction of the flick operation, wherein, when the second operation is a left-flick operation, the processing is an execution of a backspace as an input operation so as to revert the performance of the input function corresponding to the selected object.

20. A non-transitory computer-readable medium storing instructions which, when executed by a computer, perform a method of modifying an input area, the method comprising:

displaying a first input area;

detecting a user input in a second input area of a touch screen, wherein the second input area comprises a plurality of objects being displayed thereon;

performing, when the user input comprises a first operation of a one-point tap operation selecting one of the displayed objects of the second input area, an input function corresponding to the selected object, wherein the first input area displays, concurrently in time, a plurality of input candidates which are estimated based on the first operation;

modifying, when the user input comprises a second operation of an at-least-two point flick operation made upon at least one of the displayed objects of the second input area, the first input area in accordance with a processing that is selected based on a direction of the flick operation; and selecting a desired one of the displayed input candidates based on the direction of the flick operation, wherein, when the second operation is a left-flick operation, the processing is an execution of a backspace as an input operation so as to revert the performance of the input function corresponding to the selected object.

* * * * *